Aug. 27, 1968  E. M. BECKER ET AL  3,399,398
COMBUSTIBLE GAS MONITORING SYSTEM
Filed July 27, 1965  2 Sheets-Sheet 1
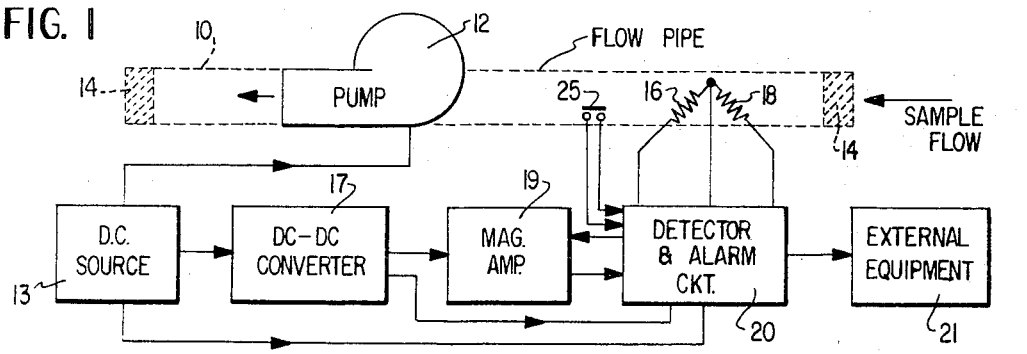
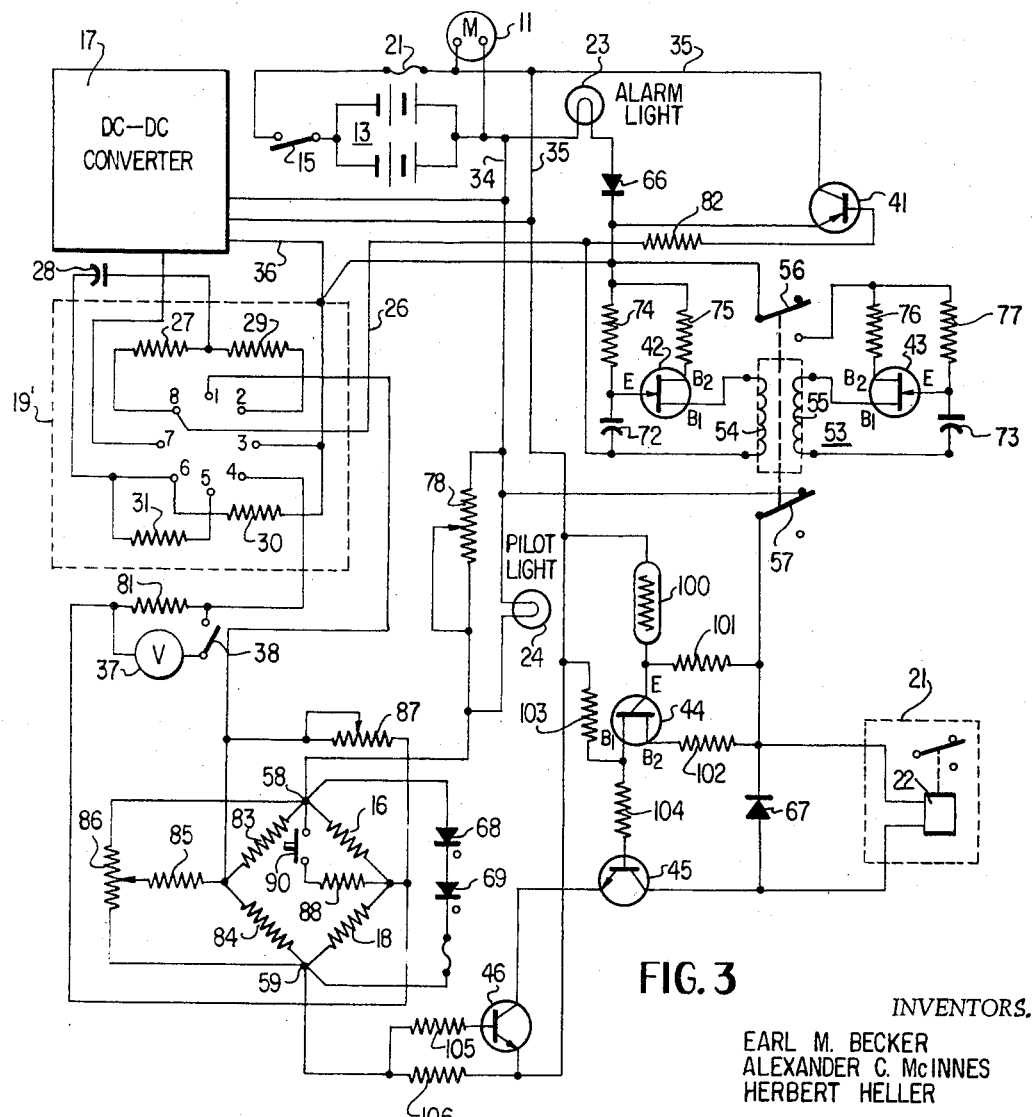
INVENTORS.
EARL M. BECKER
ALEXANDER C. McINNES
HERBERT HELLER
BY
Rupert J. Brady
ATTORNEY

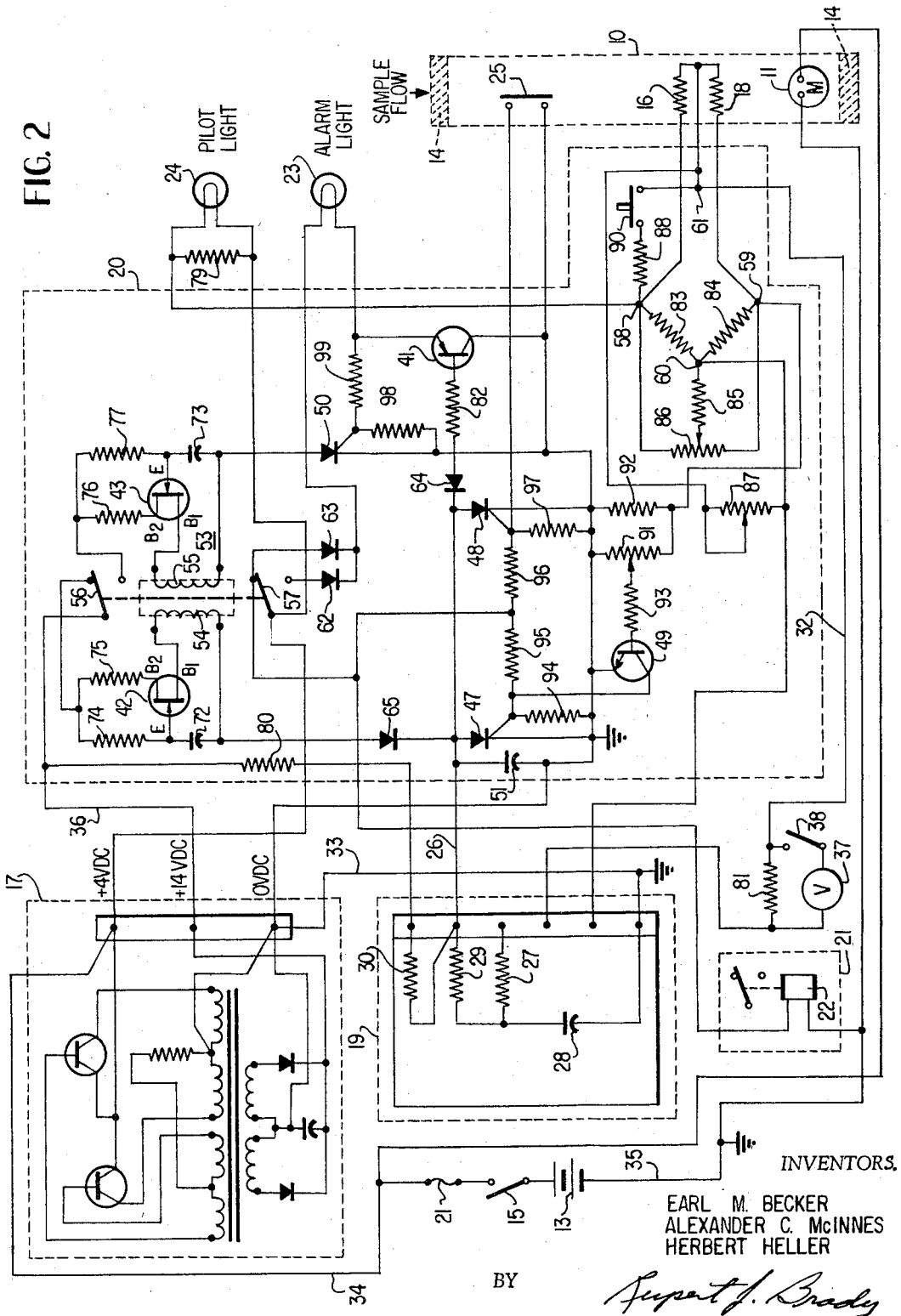

United States Patent Office 3,399,398
Patented Aug. 27, 1968

3,399,398
COMBUSTIBLE GAS MONITORING SYSTEM
Earl Matthew Becker, Pittsburgh, Alexander Crawford McInnes, Export, and Herbert Heller, Pittsburgh, Pa., assignors to Mine Safety Appliances Company, Pittsburgh, Pa., a corporation of Pennsylvania
Filed July 27, 1965, Ser. No. 475,120
16 Claims. (Cl. 340—237)

The present invention relates to combustible gas detection apparatus and more particularly to mine safety apparatus and the like in the form of a monitoring system which detects methane or other combustible gas and provides an alarm and automatic cut-off of electrical power circuits to machinery which could set off an explosion in the presence of a high sustained gas concentration and which is also adaptable to activate still other devices for the prevention or warning of an impending explosion.

It is an object of the present invention, therefore, to provide a new and improved combustible gas alarm and control system which will automatically shut down equipment when a preset combustible gas concentration is detected.

Another object of the present invention is to provide a methane detection system which will cause shut down only after a sustained alarm condition.

Still another object of the present invention is to provide a visual indication of both transient and sustained combustible gaseous condition with automatic shut down occurring only after a sustained detection of a combustible gas such as methane.

It is yet another object of the present invention to provide a methane monitoring system than provides fail-safe operation with a visual indication of detection bridge and air flow failure with a minimum of power and equipment expenditure as well as avoiding undue equipment shut down arising from the sensing of small pockets of high gas concentration as might be encountered at the face of a mine being cut.

Briefly, the subject invention comprises a bridge-type gas detector having adjacent arms which are normally catalytically active to a combustible gas such as methane located in an air flow possibly containing methane or other volatile gases, magnetic amplifier means coupled to the bridge circuit for providing a signal output indicative of the transient and sustained unbalance of the bridge due to the detection of methane, an alarm circuit providing both a visual and an automatic cut-out when the alarm persists for a predetermined length of time and with a subsequent automatic delayed reset in the event that the dangerous condition passes, and circuit means for providing a fail-safe mode of operation in the event of the failure of the bridge detector and air flow.

Other objects and advantages will become apparent as the following detailed description is read in conjunction with the following drawings wherein like reference numerals refer to identical components and wherein:

FIGURE 1 is a block diagram helpful in understanding the subject invention;

FIGURE 2 is an electrical schematic diagram illustrative of the preferred embodiment of the subject invention; and FIGURE 3 is an electrical schematic diagram illustrative of another embodiment of the subject invention.

Referring now to FIGURE 1, there is shown a gas chamber in the form of a flow pipe 10 adapted to conduct a sample of air which may possibly contain an unknown percentage of combustible gases such as methane. At each end of the flow pipe 10 is located a flashback filter 14 for the prevention of the introduction of dirt particles and the like. Within the flow pipe is located an electrical pump 12 which will force the sample of air through the flow pipe 10 in a predetermined direction. Also located within the flow pipe 10 are a pair of filaments 16 and 18 of a well-known type which are normally catalytically active to methane. Both are located within the sample stream; however, one of the filaments 16 is catalytically deactivated to methane but is nevertheless still temperature sensitive. The filament 18, on the other hand, is catalytically active and will be referred to hereinafter as the "detector" filament. The filament 16 will be referred to hereinafter as the "comparison" filament. When desirable the comparison filament 16 can be catalytically active but enclosed in an insulating envelope or located outside of the flow pipe 10. The filaments 16 and 18 form adjacent arms of a hot wire electrical bridge, not shown, but which forms a part of the detector and alarm circuit 20. An air flow sensing means, shown as a flow sensitive switch 25, is coupled to the detector and alarm circuit 20 for detecting air flow failure in the flow pipe 10. A DC source 13 is shown coupled to the pump 12 as well as the DC–DC converter 17 and the detector and alarm circuit 20. The DC source 13 provides electrical power for driving the pump 12 and provides part of the voltage necessary for operation of the detector and alarm circuitry 20. The voltage supplied to the DC–DC converter 17 from the DC source 13, on the other hand, is stepped up to power the magnetic amplifier means 19 and part of the detector and alarm circuitry 20. The magnetic amplifier means 19 receives an input from the detector and alarm circuit 20 indicative of the bridge circuit unbalance caused by the detection of a combustible gas and produces an output for activating a visual alarm and initiating an automatic shut down of the external equipment under control 21 in the event that the detector filament 18 senses a predetermined level of methane gas for a predetermined sustained length of time. Also means are provided for delaying reactivation of the equipment 21 once shut down has occurred.

Referring now to the invention in greater detail and considering FIGURE 2, the schematic diagram shown is comprised of a DC source 13 in the form of a rechargeable battery being connected on an on-off switch 15. The on-off switch in turn is connected to a DC–DC converter 17 through a fuse 21 over the circuit lead 34. The negative terminal of the battery 13 is connected to a negative bus 35 which in turn is connected to a point of reference potential hereinafter referred to as "ground." Connected between the lead 34 and the negative bus 35 is a pump motor 11 which is located on the flow pipe 10 for operating the pump 12, shown in FIGURE 1, which forces a sample flow of air through the flow pipe 10. Upon closing the on-off switch 15, the battery voltage is also applied across the relay 22 of equipment under control 21. That is, when the equipment 21, which may be for example a mining machine, is turned on, a power control relay is activated which allows the mining machine to be put into operation.

DC–DC converters of the type shown are well known to those skilled in the art. The circuit comprises a free running oscillator which alternately interrupts the DC voltage applied to its input so that a square wave of current is provided which can then be stepped up by means of transformer action. It is subsequently rectified to provide a relatively high DC output voltage across its output terminals. In the circuit disclosed, the battery voltage appearing on lead 34 is stepped up to approximately +14 volts DC at the output circuit lead 36. The converter circuit 17 likewise has one terminal connected to the negative side of the battery through the ground connection of circuit lead 33.

The detector filament 18 and the comparison filament 16 are positioned inside the flow pipe 10 and are connected in bridge circuit combination with resistors 83 and 84. Power is supplied to the bridge across terminals 58 and 59 from the battery 13 which is coupled from the +4 v. DC terminal of the converter 17 through the pilot light 24 to terminal 58. Terminal 59 is coupled to ground through the potentiometer 91 and resistance 92. The resistor 85 is coupled to the slider of potentiometer 86 which in turn in connected across terminals 58 and 59. This circuit combination is utilized as a zero adjustment for the bridge. The output terminal 61 is coupled to a magnetic amplifier 19 through a series resistor 81 over circuit lead 32. The resistor 81 is used for calibration purposes and testing for special monitoring situations by connecting the volt meter 37 across resistor 81 when the switch 38 is closed.

The magnetic amplifier means 19 is a well known switching device which is manufactured by the Control Data Corporation under the name "Magsense" Comparator. The "Magsense" Comparator is a solid state equivalent of a single pole, single throw relay which will result in a continuous output, effectively that of a contact closure, when a preset input current level, hereinafter referred to as the "alarm" level, is exceeded. However, by the use of positive feedback as provided by the resistors 27, 29, 30 and the capacitor 28, a pulsing output is obtained at circuit lead 26 over a preset intermediate range below the preset alarm level, but above the zero or normal current level. This will be referred to as the "warning" level.

The detection circuitry also includes a rheostat 87 coupled across terminals 60 and 61 for adjusting the sensitivity of the bridge. Also included is a resistance 88 connected in series to a push button switch 90 with both being connected between terminals 58 and 61. The purpose of the push button switch 90 is to test the operation of the detector by effecting an unbalance of the bridge causing an alarm in a manner which will be discussed more fully subsequently.

In operation, the detection circuitry operates such that the bridge operates in a normally balanced condition and is zeroed in the conventional manner by means of the potentiometer 86. When methane is sensed by means of the detector filament 18, it reacts with the gas, heats up and increases in resistance causing an unbalance in the bridge network. This unbalance is transmitted as an electrical signal over circuit lead 32 to the magnetic amplifier 19 which, if its magnitude is sufficient to reach the warning level, will produce a pulsing output on circuit lead 26, as measured to ground, by alternately going between zero volts DC and approximately the voltage at 36. If the unbalance exceeds the preset alarm current input level, as determined by a sufficiently high gas concentration, the output will be continuous, resulting in a voltage of approximately zero volts at lead 26 with respect to ground. It should be pointed out that the pilot light 24 is connected in the bridge circuit and will remain lit as long as there is a DC path therethrough.

The alarm circuitry is comprised of the circuitry associated with transistor 41, the alarm light 23, the silicon controlled rectifier 50 (hereinafter referred to as an "SCR"), the relay 53 and the unijunction transistors 42 and 43. More particularly, the base of the transistor 41 is connected to the output circuit lead 26 of the magnetic amplifier means 19 by means of diode 64 and resistor 82. The emitter electrode of transistor 41 is connected through the alarm light 23 to the cathode electrode of diode 63 as well as the cathode of diode 62. The anode electrode of diode 63 is connected through the switch contacts 57 to the DC supply voltage applied to the DC converter 17. Considering the unijunction transistor 42, its emitter E is connected to the common connection of resistor 74 and capacitor 72. The capacitor 72 in turn is coupled to the circuit lead 26 by means of the diode 65. The base B2 is connected to the circuit lead 36 through the relay contacts 56 and the resistor 75. Resistor 74 is also connected to the circuit lead 36 through the switch contacts 56. The base B1 is connected to the relay coil 54 while the opposite end thereof is connected to the capacitor 72. The circuitry associated with unijunction transistor 43 is similar in that the emitter electrode is connected to a resistor 77 and a capacitor 73. However, the capacitor 73 is connected to the anode electrode of the SCR 50 which has its cathode electrode connected to ground. The base B1 of unijunction transistor 43 is connected to another relay coil 55 of relay 53 and its opposite end is connected to the common connection between the capacitor 73 and the anode of SCR 50. The resistor 76 is connected between the base B2 of the unijunction transistor 43 and the open contact of relay contacts 56. The resistor 77 also is connected to the same open relay contact. With respect to the SCR 50, a resistor 98 is connected between the gate and ground while a resistor 99 is connected between the emitter of transistor 41 and the gate of SCR 50.

The alarm circuit operates as follows. When a combustible gas is sensed and the bridge becomes unbalanced by an amount exceeding the preset warning level, but below the preset alarm level, the circuit lead 26 conducts to ground intermittently through the magnetic amplifier 19 driving the transistor 41 into conduction and lighting the alarm light 23 in a flashing mode directly from the battery power source 13 through the diode 63 and the relay contacts 57. This action also allows the capacitor 72 to charge from the DC converter +14 v. DC output voltage appearing at circuit lead 36 through the resistor 74 and the diode 65. If the full alarm condition persists for a predetermined time as determined by the RC time constant of resistor 74 and capacitor 72, the capacitor 72 will charge to a level sufficient to fire the unijunction transistor 42 causing the relay 53 to close. If the full alarm does not persist for a predetermined time, the relay 53 will not latch because capacitor 72 will not charge sufficiently and the alarm light will only flash intermittently due to the action of the magnetic amplifier 19. That is to say, that at warning level, or an impending alarm situation, the alarm light will flash intermittently; however, if the full alarm condition exists for a certain length of time, such as four seconds, the relay 53 will activate because capacitor 72 will have charged sufficiently to fire unijunction transistor 42. When this occurs, the relay 22 on the equipment under control 21 is deactivated shutting down the equipment until such time as the dangerous condition ceases to exist plus a waiting period determined by the automatic reset which is described below.

In the event that the relay 53 has been pulled in due to an alarm condition, and the alarm ceases, an automatic reset action is provided by unijunction transistor 43 effecting a predetermined time delay before the equipment under control 21 may be put back into operation. When the alarm ceases and transistor 41 ceases to conduct, a pulse is transmitted to the gate electrode or SCR 50 turning it on and allowing the capacitor 73 to charge toward the voltage on circuit lead 36 through the relay contacts 56 and resistor 77. After a predetermined time, the charge on capacitor 73 will fire unijunction transistor 43 causing the relay 53 to be reset to its initial condition by means of the relay coil 55. The equipment operator may then effectively start his equipment because relay 22 will have again latched into its operative position.

The fail-safe circuitry which detects air flow failure and filament failure comprises the circuitry associated with SCR 47, SCR 48, the switch 25 located in the flow pipe 10, and transistor 49. The flow failure circuitry embodies SCR 48 and the flow switch 25. More specifically, the anode of SCR 48 is connected to circuit lead 26 which is also common to the cathode electrode of diode 64. The cathode electrode of SCR 48 is returned to ground. The flow switch 25 is coupled across resistor 97 which is connected between the gate electrode of SCR 48 and ground. Resistor 96 is coupled between the gate electrode of SCR 48 and the battery supply voltage through the relay contacts 57. In operation, the flow switch contacts 25 are normally closed during a normal flow condition. Moreover, its contacts short out the gate-to-cathode terminals on SCR 48 preventing it from firing. When a flow failure occurs, the flow switch 25 opens allowing the battery supply voltage to be dropped across resistors 96 and 97. When this occurs, SCR 48 will become conductive bringing the circuit lead 26 to ground potential. An alarm condition is thus simulated causing transistor 41 to conduct and the alarm light 23 to go on. Should the failure persist longer than the RC time constant of resistor 74 and capacitor 72 exist, the unijunction transistor 42 will fire causing relay 53 to latch. When the relay 53 latches, the voltage applied to the anode of SCR 48 applied through the diode 65 is removed during relay contact 57 transfer time causing it to become non-conductive. It remains conductive because no gate voltage is present. The alarm lamp then goes out and the reset cycle as explained with respect to unijunction transistor 43 commences. Thus, when a continuous flow failure exists, the operator in addition to having the equipment shut down due to the deactivation of relay 22 also observes an alarm lamp cycle, for example, of four seconds on and ninety seconds off. Notwithstanding this particular phase of operation, a genuine gas alarm will override this pattern giving a normal continuous alarm indication. The shut down feature can be made insensitive to flow failure of less than four seconds duration by selecting SCR 48 to have a sufficiently high holding current to prevent a latching on effect with any brief flow switch opening.

The bridge filament failure circuitry embodies SCR 47 and transistor 49. The anode of SCR 47 is connected to circuit lead 26, whereas the cathode electrode is returned to ground. Similarly, the gate of SCR 47 has a resistor 94 connected to ground and a resistor 95 connecting it to the battery supply voltage through relay contacts 57. The collector electrode of transistor 49 is connected directly to the gate electrode which is also the common junction of resistors 94 and 95. The emitter electrode of transistor 49 is returned to ground while the base is connected to the slider of potentiometer 91 through the resistance 93. The potentiometer 91 has one side connected to ground while the other is connected to terminal 59 of the bridge circuit. The operation of the filament failure circuitry is exactly the same as explained with regard to the flow failure circuitry with the exception that transistor 49 is used in place of a switch such as the flow switch 25. Also, the transistor isolates SCR 47 from the bridge circuit. When the bridge current is normal, transistor 49 is set to be conductive providing a low impedance path across the collector-emitter junctions, thereby shorting out the resistor 94 and the gate and cathode terminals of SCR 47. Any condition in the filament circuit which lowers the bridge current will lower the potential across resistor 91 causing transistor 49 to become non-conductive which will then cause SCR 47 to fire in the same manner as explained with regard to SCR 48 in the flow failure circuit. Also, the latching and reset action as described above will be repeated.

In the second embodiment shown in FIGURE 3, the detection and alarm circuits are substantially the same as described with respect to the embodiment of FIGURE 1. The primary difference between the embodiment shown in FIGURE 2 and the embodiment shown in FIGURE 3 is with respect to the fail-safe circuitry employed.

The DC to DC converter 17 and the DC supply battery are substantially the same. With respect to the magnetic amplifier means, the embodiment shown in FIGURE 3 employs a modification of the Control Data Corporation's "Magsense" comparator. The operation, however, is exactly the same. In addition, diodes 68 and 69 are forwardly connected in series across the bridge terminals 58 and 59 for added stability of the bridge voltage. Again, when an alarm pulse of signal is obtained, the magnetic amplifier 19' output current drives transistor 41 on causing sufficient current amplification to operate the alarm lamp 23 directly from the battery power source 13. The alarm pulse appearing at circuit lead 26 from the magnetic amplifier means 19' charges the capacitor 72. In the event the pulse be shorter than that required to fire unijunction transistor 42, the relay 53 will not latch and no external alarm will be effected. A sustained alarm, however, will fire unijunction 42 at a sufficient voltage to energize relay coil 54 causing contacts 57 of relay 53 to drop out thereby effecting a stop command to the machine operator due to the fact that the relay 22 on the mining machine 21 will also drop out. Also, as before, the machine 21 cannot be reactivated until after unijunction transistor 43 fires energizing relay coil 53 after a time preset by the RC time constant of resistor 77 and capacitor 73. When coil 55 energizes the relay 53 resets and relay 22 is re-energized. The machine operator may then effectively restart the equipment.

In addition, the bridge circuit may be tested by depressing the push button switch 90 that offsets the bridge balance simulating a full alarm condition when depressed for a sufficient duration of time to latch relay 53. The fail-safe circuitry is encompassed in the arrangement of the components associated with the unijunction transistor 44, and the transistors 45 and 46. More particularly, a thermistor 100 is connected in series to resistor 101 through the relay contacts 57 across the battery supply voltage which appears across leads 34 and 35. The common junction between thermistor 100 and resistor 101 is coupled to the emitter of unijunction transistor 44. The base B2 is connected to the relay contacts 57 as well as one side of the relay coil of relay 22. The base B1 of unijunction transistor 44 is connected to the negative side of the battery through resistor 103. A diode 67 is shunted across the relay coil of the external machine relay 22. The collector electrode of transistor 45 is connected to the anode of diode 67 as well as one side of the relay coil 22. Its base is connected to base B1 of unijunction transistor 44 by means of resistor 104. The emitter electrode of transistor 45 is connected in series to the collector of transistor 46. The emitter of transistor 46 in turn is connected to the negative side of the battery 13 by means of circuit lead 35. Also, resistor 106 couples the emitter of transistor 46 to junction 59 of the bridge network. The base in turn is connected to the junction 59 by means of resistor 105. The transistor configuration of transistors 45 and 46 form an AND circuit the purpose of which will be subsequently shown.

The fail-safe arrangement shown in FIGURE 3 is provided to cover not only flow failure and filament failure but power or relay failure. Transistors 45 and 46 must both be in their conducting mode, in order for the external relay 22 to function. The required base current for transistor 46 is available only when sufficient voltage is across its emitter-base junction. This condition is fulfilled when sufficient current is maintained across the low resistance 106 in series with the sensing bridge. A loss of bridge current is then detected directly by opening of the relay 22 due to the lack of conduction in the collector-emitter circuit of transistor 46.

Air flow is sensed by thermistor 100 which is located in the airstream of the flow pipe 10 shown in FIGURE 1. The thermistor is operated in its self-heating negative temperature coefficient mode so that a loss of flow will cause it to rise in temperature and thereby decrease in resistance with a corresponding decrease in voltage across it as supplied through a limiting series resistor 101 causing unijunction transistor 44 to become non-conductive. The drop in voltage causes the base drive of transistor 45 to be lost, again causing the relay circuit for relay 22 to open up.

What has been described therefore is a new and improved methane gas monitoring system which causes automatic shut down of equipment when a present combustible gas concentration is detected. Also provided is an automatic reset after a preset time delay when a dangerous condition subsides and in addition a filament failure and flow detection circuit are provided which gives an additional fail-safe capability hitherto unavailable in prior art devices. Finally, provision is made to provide a range of impending alarm signified by a flashing of an alarm light so as to give advance warning of a potentially dangerous area.

Although the present invention has been described with a certain degree of particularity, it should be understood that the present disclosure has been made only by way of illustration. For example, when desirable, a single DC battery or other voltage supply of sufficient voltage could be substituted for the battery and DC to DC converter disclosed. Also the subject invention could be utilized to activate an external alarm such as a horn or bell. It is not desired therefore that the invention be limited to those specific arrangements shown and described, but it is to be understood that all equivalents, alterations, and modifications within the spirit and scope of the invention are herein meant to be included.

We claim as our invention:

1. A monitoring and alarm system for combustible gases comprising in combination: means for providing a DC voltage; magnetic amplifier means coupled to said means for providing a DC voltage and being powered thereby; a combustible gas detector circuit coupled to said magnetic amplifier means and said means for providing a DC voltage and having an electrical bridge circuit which is responsive to the presence of a combustible gas for generating a signal which is translated to said magnetic amplifier means which in turn generates a pulsating output signal as long as said bridge circuit senses said combustible gas of a first predetermined level of concentration but generates a steady state output signal for a second level of concentration; an alarm circuit being responsive to said pulsating and steady state output signal coupled to said magnetic amplifier means, and including means for shutting down an apparatus under control when said combustible gas of said second predetermined level persists for a preset period of time and delays the possible subsequent turning on of said apparatus under control for still another preset period of time after said output signal ceases signifying a safe condition for operation.

2. A methane monitoring and alarm system for external apparatus under control comprising in combination: a first source of DC voltage having a relatively low value; converter means coupled to said first source of DC voltage for providing a second DC voltage having a relatively higher value; magnetic amplifier means coupled to said converter means and being powered therefrom; a gas detector circuit coupled to and powered by said first source of DC voltage and coupled to said magnetic amplifier means, having an electrical bridge circuit including at least one element located in a sampled air flow and being catalytically active to the presence of said gas, said bridge circuit adapted to be normally operating in a balanced condition, however generating a signal which is translated to said magnetic amplifier means when said bridge circuit senses said gas when it reaches a predetermined concentration causing said magnetic amplifier means to produce an output signal; an alarm circuit coupled to said magnetic amplifier means, being responsive to said output signal to provide a visual indication of the presence of said gas when it reaches a predetermined concentration and including circuit means for deactivating said apparatus when said output signal from said magnetic amplifier means persists for a preselected period of time and also delay the reactivating of said apparatus for still another preselected period of time after said output signal from said magnetic amplifier means ceases; and fail-safe circuit means coupled to said detector circuit and said alarm circuit for sensing a condition when said electrical bridge circuit becomes inoperative and when said sampled air flow fails for initiating deactivation of said apparatus through said alarm circuit when either condition exists.

3. A combustible gas monitoring and alarm system of the type described for controlling external apparatus comprising in combination: a first source of DC voltage having a relatively low value; a DC to DC converter means coupled to said first source of DC voltage for providing a second DC voltage having a relatively higher value; an air chamber adapted to sample the gaseous environment to be monitored; magnetic amplifier means coupled to said DC to DC converter means and being powered by said second DC voltage; a combustible gas detector circuit coupled to said magnetic amplifier means and having an electrical bridge circuit including at least one combustible gas sensing element located within said air chamber, said bridge circuit being normally in a balanced condition but becoming unbalanced when sensing said combustible gas for generating a signal which is fed to said magnetic amplifier means which generates a pulsating output signal when a first preset level of gas concentration is sensed and a steady state output signal when a second preset level of gas concentration is sensed; an alarm circuit coupled to said magnetic amplifier circuit and being responsive to said pulsating and steady state output signal for effecting deactivation of said external apparatus when combustible gas of said second present level of concentration persists for a preselected period of time and also delays the reactivation of said external apparatus for still another preselected period of time after said steady state output signal ceases signifying a safe condition.

4. A noxious gas monitoring and alarm system for controlling external equipment comprising in combination: a first source of DC voltage having a relatively low value; a second source of DC voltage having a relatively higher value; an air chamber adapted to receive a sample flow of air including pump means for forcing said sample flow of air through said air chamber; magnetic amplifier means coupled to said second source of DC voltage and being powered thereby; a noxious gas detector circuit coupled to said magnetic amplifier means and having an electrical bridge circuit including a pair of detector filaments, of which at least one is catalytically sensitive to the presence of said noxious gas, located within said air chamber and adapted to provide a bridge balance condition when said sample flow of air permits safe operation of said external equipment but provides a bridge unbalance condition in the presence of said noxious gas of a predetermined concentration, said bridge circuit providing a signal during unbalance which is coupled to said magnetic amplifier means which is adapted to provide a pulsating output signal when said bridge circuit senses a first level of gas concentration and a steady state output signal for a second level of gas concentration; an alarm circuit coupled to said magnetic amplifier means and including visual indicating means which is responsive to both said pulsating and steady state output signal, and first circuit means, responsive to said steady state output signal, to initiate shut down of said external equipment when said noxious gas of said second level of concentration persists for a preselected period of time and also delays initiation of said external equipment for still another selected period of time when the presence of said noxious gas of said second level of concentration subsides; and second circuit means powered by said first and second source of DC voltage including means for detecting inoperativeness of said bridge circuit and the failure of air flow within said air chamber for initiating shut down of said external equipment when either condition exists thereby providing a fail-safe mode of operation.

5. A combustible gas monitoring and alarm system for controlling external equipment comprising in combination: a first source of DC voltage having a relatively low value; a second source of DC voltage having a relatively higher value; and air chamber adapted to receive a sample flow of air including pump means for forcing said sample flow of air through said air chamber; magnetic amplifier means coupled to said second source of DC voltage and being powered thereby; a combustible gas detector circuit coupled to said magnetic amplifier means and having an electrical bridge circuit including a pair of detector filaments, of which at least one is catalytically sensitive to the presence of said combustible gas, located within said air chamber and adapted to provide a bridge balance condition when said sample flow of air permits safe operation of said external equipment but provides a bridge unbalance condition in the presence of said combustible gas of a predetermined concentration, said bridge circuit providing a signal during unbalance which is coupled to said magnetic amplifier means which is adapted to provide a pulsating output signal when said bridge circuit senses a first level of gas concentration and a steady state output signal for a second level of gas concentration; an alarm circuit coupled to said magnetic amplifier means and including visual indicating means which is responsive to both said pulsating and steady state output signal, and first circuit means, responsive to said steady state output signal, to initiate shut down of said external equipment when said combustible gas of said second level of concentration persists for a preselected period of time and also delays initiation of said external equipment for still another selected period of time when the presence of said combustible gas of said second level of concentration subsides; and second circuit means powered by said first and second source of DC voltage including means for detecting inoperativeness of said bridge circuit and the failure of air flow within said air chamber for initiating shut down of said external equipment when either condition exists thereby providing a fail-safe mode of operation.

6. A monitoring and alarm system as specified in claim 5, wherein said first circuit means includes a relay, coupled to the power circuits of said external equipment, which is energized after a selected period of time when said bridge circuit senses said combustible gas of a predetermined strength and resets only after another predetermined length of time when said combustible gas of a predetermined strength disappears.

7. A monitoring and alarm system as specified in claim 5, wherein said second source of DC voltage comprises a DC to DC converter coupled to said first source of DC voltage.

8. A monitoring and alarm system as specified in claim 5, wherein said magnetic amplifier means comprises a DC voltage comparator network responsive to a DC input and includes feedback means for providing a pulsed DC output signal whenever the DC input exceeds said first predetermined level of concentration but provides a steady state output signal whenever the DC input exceeds said second predetermined level of concentration.

9. A monitoring and alarm system as specified in claim 5, wherein said bridge circuit includes one filament catalytically sensitive to the presence of a combustible gas in one arm and another filament catalytically insensitive to said combustible gas in an adjacent arm, said one filament being adapted to operate as a detector filament while said other detector filament is adapted to operate as a comparison filament.

10. Apparatus as specified in claim 5, wherein said alarm circuit includes a relay for controlling the operation of said external equipment; a first semiconductor circuit responsive to said steady state output signal from said magnetic amplifier means for latching said relay when said steady state output signal persists for a predetermined length of time; and a second semiconductor circuit activated when said relay latches for providing a time delay circuit which resets said relay after another predetermined length of time.

11. Apparatus as specified in claim 10, wherein said first and said second semiconductor circuits include transistor means.

12. Apparatus as specified in claim 10, wherein said first and said second semiconductor circuits include unijunction transistors having an emitter and two base electrodes, each said unijunction transistors having a resistance-capacitive timing circuit coupled to respective emitters for firing said unijunction transistors after a predetermined period of time.

13. A monitoring and alarm system as specified in claim 5, wherein said second circuit means includes a controlled rectifier coupled to said alarm circuit and an air flow responsive switch coupled to said controlled rectifier preventing it from becoming conductive while there is unimpeded air flow but allowing said controlled rectifier to become operative upon the failure of air flow, said controlled rectifier thereby being triggered into its conductive state and triggering said alarm circuit for effecting deactivation of said external equipment.

14. Apparatus as specified in claim 5, wherein said second circuit means includes another controlled rectifier coupled to said alarm circuit, and a transistor coupled to said controlled rectifier for controlling the firing thereof, being conductive while said bridge circuit remains operative, but becoming nonconductive on bridge current failure rendering said controlled rectifier conductive and initiating an alarm circuit condition of said alarm circuit and effecting deactivation of said external equipment.

15. Apparatus as specified in claim 5, wherein said second circuit means includes a first and a second transistor coupled together in an AND circuit configuration to said external equipment, said first transistor being responsive to the operation of said bridge circuitry and adapted to become non-conducting in the event said bridge circuit becomes inoperative, said second transistor adapted to become inoperative in the event of air flow failure in said air chamber, so that said external equipment becomes deactivated in the event that either said first or said second transistor becomes non-conductive.

16. Apparatus as specified in claim 5, wherein said DC to DC converter means comprises a circuit including a transistor oscillator, a step-up transformer coupled to said transistor oscillator, and rectifier means coupled to said step-up transformer.

References Cited

UNITED STATES PATENTS

| | | | |
|---|---|---|---|
| 2,499,806 | 3/1950 | Wouk et al. | 340—237 |
| 3,147,465 | 9/1964 | Brown et al. | 340—237 |

JOHN W. CALDWELL, *Primary Examiner.*

D. MYER, *Assistant Examiner.*